Patented Sept. 12, 1950

2,522,140

UNITED STATES PATENT OFFICE 2,522,140

METHOD OF BREAKING EMULSIONS TO RECOVER WOOL FAT

Roy Shawcross, Portland, Oreg.

No Drawing. Application April 29, 1946, Serial No. 665,896

2 Claims. (Cl. 260—412.5)

The present invention relates to a process of breaking dilute oil-in-water emulsions for recovering the oily component thereof. It is particularly concerned with the precipitation of the dispersed phase of an emulsion, such as wool wash water, which comprises a dilute dispersion of an oil or fatty material in a large quantity of water.

The present invention broadly provides a method for treating certain industrial waste waters comprising colloidal suspensions or emulsions of the oil-in-water type for the purpose of economically recovering the valuable constituents thereof.

Wool wash water is one example of such an emulsion. Raw or natural wool usually contains about 20 per cent by weight of wool grease (lanolin) and considerable dirt, etc., which must be removed before the wool can be spun. To accomplish this the wool is passed through one or more tanks containing a dilute aqueous solution of soap (e. g. sodium oleate), soda ash or both (about 1-2 per cent soap or about 0.1 per cent soda ash or both), with or without a small amount of a wetting agent. The washing removes the dirt, suint, etc., along with all but 1 to 2 per cent of the natural wool fat to form a very tight and dilute emulsion containing the protein materials, suint, etc., and from 5 to 15 pounds grease per 100 gallons of wash water. Due to the emulsified condition of the grease and the high degree of dilution, it has heretofore been impossible economically to recover the wool grease content of the wash water.

Prior attempts to recover the wool grease have included the acidification of the wash water to precipitate the protein and wool grease content or the use of a centrifuge for the purpose of breaking the aqueous dispersion by mechanical means. Both of these processes are costly, the first one giving only a very poor grade of wool grease and the second removing only about 2 per cent of the lanolin present in the wash water.

The present invention is based on the discovery that the wool grease or relatively pure lanolin can economically be recovered from wool wash water by passing the wash water through a bed of a granular hydrogen ion-exchange material whereby the wool grease and protein material are precipitated in the bed from which the wool grease can be extracted by periodic washing of the bed with a suitable solvent for the grease.

The action of the ion-exchange material is not fully understood. It probably primarily involves a replacement of the sodium or other metal ions in the emulsion with hydrogen ions thereby rendering the soap or alkali content of the wash water ineffective as an emulsifying material.

The fact that substantially all of the protein material is also precipitated onto the ion-exchange material may, in one way or another, be a contributing factor in the separation of the wool grease from the wash water. Whatever may be the exact nature of the chemical reactions involved it has been proven definitely that substantially all of the protein material and the wool grease precipitates on and collects in the resin bed. In all cases, up to the point where the exchange material is substantially exhausted, the effluent from the bed is clear as compared with the cloudy, greasy appearance of the wash water as introduced into the bed of ion-exchange material.

Any of the known cation exchange materials can be used in the practice of the present invention provided the ion-exchange reaction and regeneration of the material can be carried out according to the hydrogen cycle. While the hydrogen cycle has been found to be most effective, it can be used in conjunction with the sodium cycle, the effectiveness of the latter perhaps being due to the exchange of sodium ions for the protein ions to remove the protein components of the wash water which may function as emulsifying agents or as protective colloids.

After the wool wash water has been passed through or over the ion-exchange resin, the wool grease which has collected in the resin bed is first removed by passing a warm solvent for the grease such as carbon tetrachloride, chloroform, ethyl acetate, butyl acetate, ether, trichloroethylene, naphtha solvents or the like through the bed. After all of the grease has been removed the ion-exchange material is reactivated in the usual manner by passing an acid, such as hydrochloric acid, sulphuric acid, etc., through the bed. The acid treatment results in an exchange of the acid hydrogen ion for the metal ions which have collected on the exchange material, the latter ions and excess acid then being removed by suitable washing with water so that the bed is in a condition to be used again for treatment of additional wool wash water. By employing a plurality of beds and operating on a time cycle, one bed can be used for treating wash water while the second is being washed with an organic solvent for the removal of the wool grease and the third is being regenerated by acid treatment.

Employing a bed of granular commercially available hydrogen ion-exchange resin comprising an insoluble, infusible sulfonated phenolic resin in its acid form (Amberlite IR-100-H; The Resinous Products & Chemical Company, Philadelphia, Pennsylvania), wool wash water having a pH of between 9 and 11 was passed downwardly through a tower containing the resin until the effluent water began to show signs of cloudiness. The clear effluent was found to have a pH which during the entire period was below 7. The resin bed was then washed with warm trichloroethylene passed upwardly through the bed. This solvent dissolved the wool grease, the wool grease or lanolin was then recovered by evaporation of the solvent to obtain a superior grade of technical lanolin analyzing as follows:

|  | Obtained | Pure Lanolin |
|---|---|---|
| Specific Gravity | 0.9413-0.9449 (17°) | 0.9271 (40°) |
| Saponification Value | 102.4 (Avg.) | 91.4 |
| Iodine Number | 25.8-28.9 | 28.0 |
| Refractive Index | 1.4781-1.4822 | 1.4800-1.4832 |
| Specific Rotation | 6.7 (35°) | 6.9 (35°) |

The solvent recovered from the wool grease was centrifuged to remove any water and was then distilled in order to have a substantially acid-free solvent for the solution of additional wool grease.

After the wool grease had been dissolved from the resin bed, the resin was regenerated by treatment with a solution of hydrochloric acid followed by a water wash to remove the salt, excess acid, and the protein material released from the bed by the reactivation treatment. The resin was then in condition for treatment of a second quantity of wool wash water.

While the invention has been described with particular reference to the treatment of wool wash water it is to be understood that it is also applicable to the treatment of other industrial waste waters containing suspended or emulsified oily and protein materials for the purpose of recovering the suspended matter. For example, the process may be employed in the treatment of the so-called "stick water" which is the water from various processes in the fish industry, such as the processing of the fish livers for the recovery of the vitamin oils, cooking tuna fish or salmon, or any other water which comes into contact with fish in the processing thereof and which ordinarily is discarded and wasted in spite of the fact that it contains substantial quantities of valuable oily and protein materials. The process employed in handling such waters is substantially the same as that employed in the treatment of wool wash water. As the "stick water" is passed through the ion-exchange bed the protein material deposits on the ion-exchange resin carrying with it substantial quantities of the oily component. The oily component is then separated from the protein material by washing the bed with a solvent for the oily component after which the ion-exchange bed can be freed of the protein material and regenerated by treatment with a suitable acid.

From the above, it will be seen that I have provided an inexpensive and effective process for treating large volumes of dilute aqueous suspensions or emulsions of the oil-in-water type for the purpose of recovering the oily or fatty components thereof. When a protein material or its decomposition products are also present, the process of the present invention has the additional advantage of effecting a separation of the oily material from the protein material to permit the final recovery of the pure or substantially pure oily component.

While I have described what I consider the most advantageous ways of carrying out my invention, modifications may be made without departing from the spirit of my invention and reference is therefore made to the appended claims for a definition of the scope of my invention.

What I claim is:

1. The method of recovering wool grease from wool wash water which comprises contacting the wool wash water with pieces of a solid ion exchange material comprising an insoluble, infusible sulfonated phenolic resin in its acid form thereby breaking the wash water emulsion and depositing the wool fat on the pieces of ion exchange material.

2. The method of recovering wool grease from wool wash water which comprises contacting the wool wash water with pieces of a solid ion exchange material comprising an insoluble, infusible sulfonated phenolic resin in its acid form thereby breaking the wash water emulsion and depositing the wool fat on the pieces of ion exchange material, and periodically passing through the ion exchange material a solvent for the wool fat thereby dissolving the same and separating it from the ion exchange material.

ROY SHAWCROSS.

REFERENCES CITED

The following references are of record in the file of this patent:

UNITED STATES PATENTS

| Number | Name | Date |
|---|---|---|
| 2,171,198 | Urbain et al. | Aug. 29, 1939 |
| 2,171,201 | Urbain et al. | Aug. 29, 1939 |
| 2,352,365 | Booth et al. | June 27, 1944 |

FOREIGN PATENTS

| Number | Country | Date |
|---|---|---|
| 66 | Great Britain | Nov. 2, 1889 |
| 11,741 | Great Britain | July 15, 1887 |
| 805,092 | France | Nov. 10, 1936 |